United States Patent
Yu et al.

(10) Patent No.: US 8,734,683 B2
(45) Date of Patent: May 27, 2014

(54) GRAPHENE NANO-SHEETS AND METHODS FOR MAKING THE SAME

(75) Inventors: Yiliang Yu, Oakville (CA); Sandra J. Gardner, Oakville (CA)

(73) Assignee: Xerox Corporation, Norwalk, CT (US)

(*) Notice: Subject to any disclaimer, the term of this patent is extended or adjusted under 35 U.S.C. 154(b) by 8 days.

(21) Appl. No.: 13/306,540

(22) Filed: Nov. 29, 2011

(65) Prior Publication Data

US 2013/0136684 A1    May 30, 2013

(51) Int. Cl.
*C04B 20/06*    (2006.01)

(52) U.S. Cl.
USPC .................... 252/378 R; 423/445 B

(58) Field of Classification Search
USPC .................. 252/378 R; 423/45 B, 445 R, 448
See application file for complete search history.

(56) References Cited

U.S. PATENT DOCUMENTS 6,287,694 B1 * 9/2001 Zaleski et al. ............... 428/402
7,754,184 B2 * 7/2010 Mercuri ........................ 423/448

OTHER PUBLICATIONS

Q. Liu, et al. "Organic photovoltaic cells based on an acceptor of soluble graphene". Appl. Phys. Lett. 92, 223303 (2008); http://dx.doi.org/10.1063/1.2938865 (3 pages).*

VACOM. Vacuum Pressure Converter. http://www.vacom-vacuum.com/2/3/druckbereiche.php Accessed online Feb. 29, 2012.*

"Synthesis of Water Soluble Graphene" Yongchao Si and Edward T. Samulski. Nano Letters 2008 8 (6), 1679-1682.*

Zhou, W. et al. "Preparation of graphene by exfoliation of graphite using wet ball milling". J. Mater. Chem., 2010, 20, 5817-5819.*

Surface Energy Modification by Spin-Cast, Large-Area Graphene Film for Block Copolymer Lithography Bong Hoon Kim, Ju Young Kim, Seong-Jun Jeong, Jin Ok Hwang, Duck Hyun Lee, Dong Ok Shin, Sung-Yool Choi, and Sang Ouk Kim ACS Nano 2010 4 (9), 5464-5470.*

* cited by examiner

*Primary Examiner* — Stanley Silverman
*Assistant Examiner* — Richard M Rump
(74) *Attorney, Agent, or Firm* — MH2 Technology Law Group LLP

(57) ABSTRACT

Various embodiments provide materials and methods for forming a graphene product by vacuum induction heating expandable graphite. The graphene product can include graphene nano-sheets with high purity and uniform thickness. The graphene nano-sheets can contain carbon of more than about 99% by weight. The graphene nano-sheets can be exfoliated or dispersed within a matrix of a semiconducting polymer to form a graphene-containing composite.

17 Claims, No Drawings

GRAPHENE NANO-SHEETS AND METHODS FOR MAKING THE SAME

DETAILED DESCRIPTION

Background

Graphene has attracted considerable interest in recent years due to extraordinary electronic, thermal, and mechanical properties. Potential applications of graphene include transparent electrodes and semiconductors, nano-composite materials, batteries, supercapacitors, hydrogen storage, etc.

Conventional approaches for producing graphene sheets include a bottom-up method of forming $sp^2$-bonding between carbon atoms in a monolayer. Chemical vapor deposition (CVD) and epitaxial growth from silicon carbide are used for this bottom-up method. Another conventional approach for producing graphene sheets includes a top-down method by exfoliating graphite through chemical oxidation and reduction. This top-down method is also known as Hummer's method. However, oxidative agents and toxic reducing agents must be used in Hummer's method, which creates defects in the final graphene sheets.

It is therefore desirable to develop an easy, clean, and effective method for forming graphene products with high purity.

SUMMARY

According to various embodiments, the present teachings include a method of making expanded graphite. The expanded graphite can be formed by first placing expandable graphite within a chamber and then applying vacuum to the chamber. An electric current can then be applied to induction heat the expandable graphite under the vacuum to form the expanded graphite.

According to various embodiments, the present teachings also include a method of making a graphene product. In this method, expandable graphite can be placed within a chamber. The expandable graphite can include an intercalation agent capable of producing thermal expansion. A vacuum can then be applied to the chamber. By applying an electric current to induction heat the expandable graphite under the vacuum, expanded graphite can be formed. The expanded graphite can then be exfoliated in a solvent to form one or more graphene nano-sheets dispersed in the solvent.

According to various embodiments, the present teachings further include graphene nano-sheets produced by induction heating expandable graphite under a vacuum. The graphene nano-sheets can be substantially wrinkle free with a uniform thickness that is within plus or minus about 1 nm of a desired thickness. The graphene nano-sheets can be substantially free of impurity moieties. The graphene nano-sheets can have a carbon content of at least about 99% by weight.

It is to be understood that both the foregoing general description and the following detailed description are exemplary and explanatory only and are not restrictive of the present teachings, as claimed.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. The following description is, therefore, merely exemplary.

Various embodiments provide materials and methods for forming graphene products. The graphene products can include expanded graphite formed of graphene nano-sheets, exfoliated graphene nano-sheets, and/or a graphene-containing composite including graphene nano-sheets and an organic semiconductor.

In one embodiment, graphene nano-sheets can be formed in a vacuum environment using induction heating of expandable graphite. The resultant expanded graphite can then be exfoliated in a solvent (or a gas carrier) to form a graphene dispersion including graphene nano-sheets dispersed in the solvent. In embodiments, the graphene nano-sheets can be dispersed in a solution containing conjugated polymers or other organic semiconductors to form a graphene dispersion and then form a graphene-containing composite.

The disclosed methods of using vacuum induction heating can provide an easy, clean, and effective process, because no conventional oxidation and reduction chemicals are used. Additionally, due to use of a vacuum, gaseous chemicals such as oxygen are not involved. Graphene products with high purities can then be generated. Further, induction heating is a fast heating process with high heating rates. Desired high temperatures can be reached in a short time. Furthermore, expandable graphite can be heated homogeneously by induction heating, since the expandable graphite is conductive. Conventional thermal expansion methods using a thermal oven are limited by thermal diffusion, especially when graphite has a large size. Therefore, the expansion is not as efficient as induction heating under vacuum. For this reason, the disclosed vacuum induction heating method can form thinner product with more uniform thicknesses, as compared to conventional oven-based thermal expansion processes.

As used herein, the term "graphite" refers to a three dimensionally (3D) ordered array of carbon atoms with planar sheets of arrayed atoms stacked in a defined, repeating pattern. The term "expandable graphite" or "thermally expandable graphite" refers to graphite intercalation compound where molecules, for example an intercalation agent, are incorporated in between the planar sheets. The intercalation agent can produce an expansion or a thermal expansion of the graphite upon heating which changes the intercalation agent from a liquid or solid phase into a gas phase. Increase of volume of the intercalation agent upon phase change can force the adjacent graphene layer within the expandable graphite to separate.

In embodiments, the thermally expandable graphite can be an intercalation compound of graphite that expands and/or exfoliates when heated. Intercalation is a process whereby an intercallant agent is inserted between the planar sheets of a graphite crystal or particle. The term "expandable graphite" can also be referred to as "intercalated graphite". A variety of chemical species or intercalation agents can be used to intercalate graphite materials. These intercalation agents can include halogens, alkali metals, sulfate, nitrate, various organic/inorganic acids such as $H_2SO_4$ or HCl, aluminum chloride, ferric chloride, other metal halides, arsenic sulfide, thallium sulfide, etc. In one example, a graphite intercalation compound can include the "sulfate" intercalation compound sometimes referred to as "graphite bisulfate". This material can be manufactured by treating highly crystalline natural flake graphite with a mixture of sulfuric acid and certain other oxidizing agents which aid in "catalysis" of the sulfate intercalation. The resultant product can be a highly intumescent form of graphite, which is referred to herein as "expanded graphite".

As used herein, the term "expanded graphite" refers to a graphite product in a highly intumescent form, which can be obtained by processing the expandable graphite. In one embodiment, the expanded graphite can be formed by induction heating the expandable graphite under a vacuum. The intercalation agent(s) in the expandable graphite can be removed during the process. As a result, the expanded graphite can be free of intercalation agent(s). In embodiments, the expanded graphite can further be exfoliated to form graphene nano-sheets.

As used herein, the term "graphene nano-sheet" refers to a graphene product including one or a few atomic monolayers of $sp^2$-bonded carbon atoms. The disclosed graphene nano-sheet can have an average thickness, for example, ranging from about 0.3 nm to about 15 nm, or ranging from about 0.3 nm to about 10 nm, or ranging from about 0.3 nm to about 6 nm. Alternatively, the disclosed graphene nano-sheet can have from about 1 graphene layer to about 30 graphene layers, or ranging from about 1 to about 20 graphene layers, or ranging from about 1 to about 10 graphene layers. Formed by vacuum induction heating methods, graphene nano-sheets can be wrinkle-free and can provide a uniform thickness across each graphene nano-sheet. For example, the graphene nano-sheets can have a uniform thickness that is within plus or minus about 1 nm of a desired thickness, or within plus or minus about 0.5 nm, or within plus or minus about 0.3 nm. It should be noted that graphene or graphene nano-sheets produced by conventional methods such as Hummer's methods usually contain wrinkles, which are most likely caused by defects in the graphene nano-sheets as known to one of ordinary skill in the art.

In embodiments, expanded graphite and/or graphene nano-sheets generated by vacuum induction heating can be composed substantially of carbon, for example, having at least about 98% or at least about 99% of carbon by weight, including from about 99% to about 99.99% by weight. In some embodiments, the expanded graphite and/or graphene nano-sheets generated by vacuum induction heating can be substantially free of S, Cl, N, or other impurity atoms, which are normally detected in graphene nano-sheets produced using Hummer's methods. Detection of these atoms can be performed using any suitable methods including, for example SEM EDS analysis. In some embodiments, the expanded graphite/graphene nano-sheets generated by vacuum induction heating can be substantially free of oxygen. That means, the oxygen contents can be for example less than about 2% by weight, including less than about 1%, or less than about 0.5%, or less than about 0.1% by weight of the entire product generated from vacuum induction heating. Although the expanded graphite/graphene nano-sheets prepared according to various embodiments can be substantially free of impurity species such as O, S, Cl, N, the graphene nano-sheets can be, for example, subsequently modified such as surface modified, so that the modified graphene can, contain these species for certain applications.

Various embodiments provide methods for forming expanded graphite/graphene products by using thermally expandable graphite. Exemplary expandable graphite can be that manufactured by treating flake graphite with various intercalation reagents that migrate between the graphene layers in a graphite crystal and remain as stable species, for example, as supplied by Carbon Asbury Inc. (Asbury, N.J.).

The thermally expandable graphite can be placed in a chamber. The chamber can be a vacuum chamber for conducting induction heating. In embodiments, the vacuum applied to the thermally expandable graphite can have a vacuum pressure in the vacuum chamber ranging from about 1 mbar to about $10^{-7}$ mbar, or from about 0.1 mbar to about $10^{-6}$ mbar, or from about $10^{-4}$ mbar to about $10^{-7}$ mbar.

Under the vacuum environment, electric current can then be applied to induction heat the thermally expandable graphite in the vacuum chamber until a heating temperature is achieved. In embodiments, the heating temperature can be from about 500° C. to about 1100° C., or from about 600° C. to about 1050° C., or from about 700° C. to about 100° C. The thermally expandable graphite can be heated at the heating temperature for a time length of from about 0.1 second to about 5 minutes, or from about 1 second to about 5 minutes, or from about 30 seconds to about 2 minutes. The heating temperature, the heating time, and their combination are not limited. Any suitable known devices for applying vacuum and/or induction heating can be used. The thermally expandable graphite can then be expanded. Optionally, the expanded graphite can be cooled to room temperature.

In embodiments, the expandable/expanded graphite can have an expansion rate of about 200% or more by volume, or ranging from about 200% to about 1000% by volume, or ranging from about 300% to about 800% by volume of the original thermally expandable graphite prior to the vacuum induction heating process. In embodiments, the expanded graphite can be formed free of intercalation agents, which are contained in the original expandable graphite.

After optionally cooled to room temperature, the expanded graphite can be exfoliated, for example, by dispersing in a solvent. In embodiments, a sonicator or other mechanical mixing techniques can be used to facilitate exfoliating and/or dispersing of the expanded graphite. Various solvents including, but not limited to, toluene, chlorobenzene, dichlorobenzene, trichlorobenzene, chlorotoluene, xylene, mesitylene, chloroethane, chloromethane, dimethylformamide (DMF), N-Methyl-2-pyrrolidone (NMP), and/or the like, can be used. A graphene dispersion can then be formed having one or more graphene nano-sheets dispersed in the solvent.

In embodiments, a stabilizer can be included in the solvent for exfoliating/dispersing the expanded graphite and forming the graphene dispersion. Exemplary stabilizers can include surfactants, insulative polymers such as polystyrene, PMMA, polyurethane, and the like, conjugated compounds including organic semiconductors such as small molecular compounds and/or semiconducting polymers.

In embodiments, graphene nano-sheets can be present in an amount ranging from about 0.0001% to about 0.5%, or from about 0.0005% to about 0.1%, or from about 0.001% to about 0.06% by weight of the graphene dispersion regardless of whether the organic semiconductors are present. In embodiments, when organic semiconductors are used, they can be present in an amount ranging from about 0.001% to about 20%, or from about 0.1% to about 10%, or from about 0.1% to about 5%, by weight of the graphene dispersion.

Exemplary organic semiconductors can include those described in co-pending U.S. patent application Ser. No. 12/575,739, filed Oct. 8, 2009 and entitled "Electronic Device," the disclosure of which is incorporated herein by reference in its entirety.

Exemplary small molecular compounds can include pentacene and pentacene derivatives (pentacene precursors and pentacene analogs), oligothiophenes, phthalocyanines, naphthalene-bisimides, and/or other fused-ring aromatic compounds.

Exemplary semiconducting polymers can include, for example, a polythiophene of Formula (I):

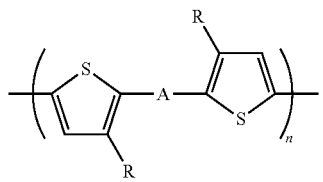

wherein A is a divalent linkage; each R is independently selected from hydrogen, alkyl, substituted alkyl, aryl, substituted aryl, alkoxy or substituted alkoxy, a heteroatom-containing group, halogen, —CN, or —$NO_2$; and n is from 2 to about 5,000. In some embodiments, R is not hydrogen.

The term "alkyl" refers to a radical composed entirely of carbon atoms and hydrogen atoms which is fully saturated and of the formula $C_nH_{2n+1}$. The term "aryl" refers to an aromatic radical composed entirely of carbon atoms and hydrogen atoms. The term "alkoxy" refers to an alkyl radical which is attached to an oxygen atom.

The substituted alkyl, substituted aryl, and substituted alkoxy groups can be substituted with, for example, alkyl, halogen, —CN, and —$NO_2$. An exemplary substituted alkyl group can be a perhaloalkyl group, wherein one or more hydrogen atoms in an alkyl group are replaced with halogen atoms, such as fluorine, chlorine, iodine, and bromine. The term "heteroatom-containing group" refers to a radical which is originally composed of carbon atoms and hydrogen atoms that forms a linear backbone, a branched backbone, or a cyclic backbone. This original radical can be saturated or unsaturated. One or more of the carbon atoms in the backbone can then be replaced by a heteroatom, generally nitrogen, oxygen, or sulfur, to obtain a heteroatom-containing group. The term "heteroaryl" refers generally to an aromatic compound containing at least one heteroatom replacing a carbon atom, and may be considered a subset of heteroatom-containing groups.

In particular embodiments, both R groups are alkyl having from about 6 to about 18 carbon atoms. In certain examples, both R groups are the same. In further desired embodiments, both R groups are alkyl, particularly —$C_{12}H_{25}$.

The divalent linkage A can form a single bond to each of the two thienyl moieties in Formula (I). Exemplary divalent linkages A can include:

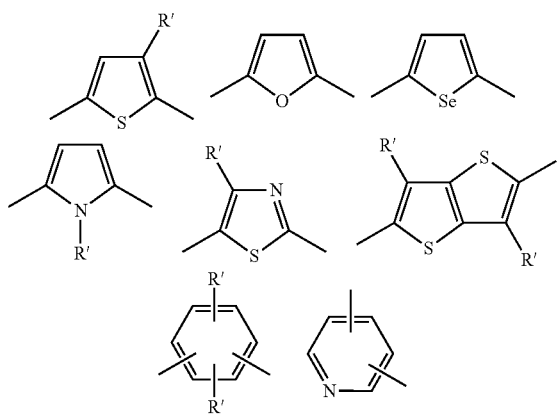

-continued

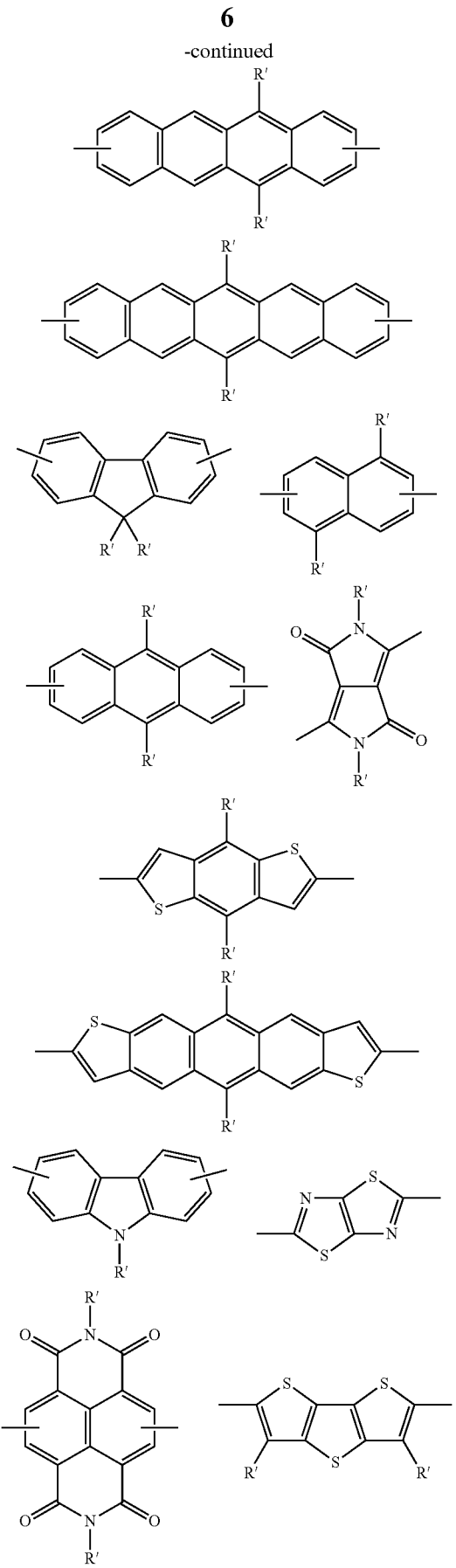

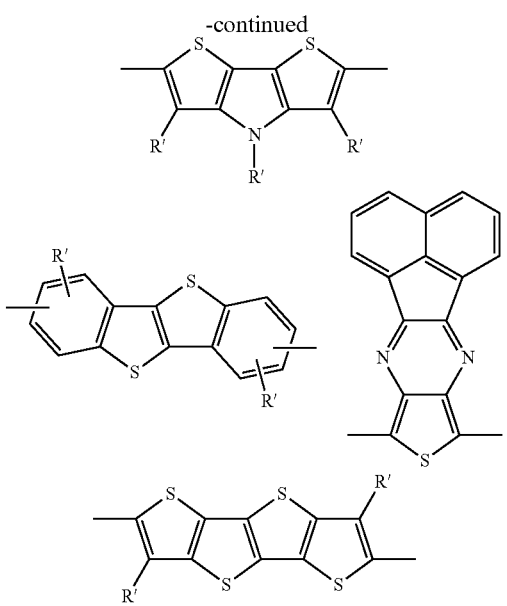

and combinations thereof, wherein each R' is independently selected from hydrogen, alkyl, substituted alkyl, aryl, substituted aryl, alkoxy or substituted alkoxy, a heteroatom-containing group, halogen, —CN, and/or —NO$_2$.

In embodiments, the semiconducting polymers can have a weight average molecular weight of from about 1,000 to about 1,000,000, or from about 5000 to about 100,000.

In embodiments, a graphene-containing composite can be formed from the graphene dispersion containing graphene nano-sheets. For example, the disclosed graphene dispersion can be applied (e.g., coated or printed) to a substrate and then dried or otherwise cured to remove solvent from the graphene dispersion and form the graphene-containing composite. The substrate may or may not be removed after the formation of the graphene-containing composite. Any substrates, rigid or flexible, can be used including, for example, semiconductors, metals, ceramics, plastics, glass, paper, and/or wood.

In one embodiment, the graphene-containing composite can include a plurality of graphene nano-sheets dispersed within a matrix of semiconducting polymer(s). The graphene nano-sheets can be present in an amount ranging from about 0.001% to about 5.0%, or from about 0.01% to about 3.0%, or from about 0.01% to about 0.5% by weight of the graphene-containing composite.

Example 1

Thermally expandable graphite flakes were obtained from Asbury Carbon Inc. (Asbury, N.J.). The graphite flakes were added into a tungsten vacuum evaporation boat, which was then placed within a vacuum chamber (Edwards Auto 306 evaporation system). The vacuum chamber was subsequently pumped down to a pressure of about ~2×10$^{-6}$ m bar. About 70% of the power (220 V, 7 Am input) was then used to heat up the boat for about 1 minute. The temperature was reached about 850° C. The graphite was expanded significantly as a black twisted solid to form the expanded graphite.

Example 2

A small amount of the expanded graphite produced in Example 1 was added into dichlorobenzne solvent, and sonicated with a bath sonicator for a few minutes, followed by probe sonication (of about 50% power) for about 3 minutes to better exfoliate and separate the individual graphene layers. After both bath and probe sonication procedures, the mixture was then centrifuged at about 3500 rpm for about 10 min to remove large particles that were not successfully exfoliated. Following centrifugation, stable graphene dispersion containing graphene nano-sheets was obtained, as revealed by a dark or gray color of the solution. Concentration of graphene nano-sheets in the solution was calculated from UV-Vis absorbance spectra at a wavelength of about 660 nm using the Lambert-Beer law with the extinction coefficient. The UV-Vis spectroscopy, performed using a Casey UV-Vis-NIR spectrophotometer, depicted that the concentration of generated graphene nano-sheets was up to about 0.017 mg/ml.

To examine the formed graphene nano-sheets, the graphene dispersion was spin coated on a silicon wafer and examined. SEM images showed graphene nano-sheets were flat on the silicon wafer without wrinkles. EDS analysis of graphene nano-sheets on silicon nitride substrate indicated that there were no impurity atoms such as S, N, Cl, etc. No oxygen atom was detected. These results depicted that the graphene nano-sheets produced by the vacuum induction heating methods had a high purity. The thickness of the graphene nano-sheets was measured by AFM, which showed a thickness of less than about 10 nm in this example. Stacked graphene nano-sheets and/or folded single graphene nano-sheet were also produced and observed.

Example 3

The expanded graphite was exfoliated in a solvent containing stabilizer(s). In this example, the expanded graphite was added into a 0.03 wt % poly(3,3'''-didodecylquatefthiophene) (PQT) solution in a solvent of 1,2-dichlorobenzene. The expanded graphite had about 50 wt % loading of PQT. After sonication and centrifugation, substantially no precipitation was observed. That is, the expanded graphite was exfoliated and stabilized in the graphene dispersion. The graphene dispersion containing graphene nano-sheets and PQT was then spin-casted to form a film of a graphene-PQT composite on a silicon wafer. SEM images showed that the graphene-PQT composite included graphene nano-sheets dispersed in a polymer matrix of PQT, Comparative Example 1

The same thermal expandable graphite used in Example 1 was placed in a thermal oven for comparison. Under a forming gas (about 4.5 wt % hydrogen in Nitrogen) flow, the graphite was heated at about 850° C. for about 1 minute. Expanded graphite was then formed, taken out of the oven, and sonicated in the same way as depicted in Example 2. AFM images of the spin coated films showed exfoliated graphene nano-sheets having a thickness of about 40 nm to about 50 nm, which were significantly larger than graphene nano-sheets produced in Example 2. This indicated that vacuum induction heating method was more efficient than conventional oven expansion.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any, given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method of making graphene nano-sheets, comprising:
   placing an expandable graphite within a chamber;
   applying vacuum to the chamber, such that a vacuum pressure in the chamber ranges from about $10^{-1}$ mbar to about $10^{-7}$ mbar in the chamber;
   applying an electric current to induction heat the expandable graphite within the chamber under the vacuum to form an expanded graphite; and
   exfoliating the expanded graphite in a solvent to form one or more graphene nano-sheets dispersed in the solvent.

2. The method of claim 1, further comprising expanding the expandable graphite by about 200% to about 1000% by volume within the chamber to form the expanded graphite.

3. The method of claim 1, wherein the expandable graphite is heated to a temperature ranging from about 500° C. to about 1100° C.

4. The method of claim 3, wherein the expandable graphite is heated at the temperature for a time length ranging from about 1 second to about 5 minutes.

5. The method of claim 1, wherein the expandable graphite comprises an intercalation agent.

6. The method of claim 5, wherein the intercalation agent is selected from the group consisting of halogens, alkali metals, sulfate, nitrate, acids, metal halides, and combinations thereof.

7. A method of making a graphene product comprising:
   placing expandable graphite within a chamber, the expandable graphite comprising an intercalation agent capable of producing thermal expansion;
   applying vacuum to the chamber, wherein a vacuum pressure ranges from about $10^{-1}$ mbar to about $10^{-7}$ mbar in the chamber;
   applying an electric current to induction heat the expandable graphite under the vacuum to form expanded graphite; and
   exfoliating the expanded graphite in a solvent to forms one or more graphene nano-sheets dispersed in the solvent.

8. The method of claim 7, wherein the electric current is applied to reach a heating temperature ranging from 500° C. to about 1100° C.

9. The method of claim 7, wherein each of the one or more graphene nano-sheets is formed to have an average thickness ranging from about 0.3 nm to about 15 nm.

10. The method of claim 7, wherein the one or more graphene nano-sheets are substantially free of impurity species comprising S, N, Cl, O atoms, or their combinations.

11. The method of claim 7, wherein the one or more graphene nano-sheets comprise carbon of at least about 99% by weight.

12. The method of claim 7, wherein the step of exfoliating the expanded graphite comprises sonicating the expanded graphite to form the one or more graphene nano-sheets in the solvent.

13. The method of claim 7, wherein the solvent comprises toluene, chiorotoluene, chlorobenzene, dichlorobenzene, xylene, mesitylene, chloroethane, chloromethane, dimethylformamide (DMF), N-Methyl-2-pyrrolidone (NMP), or combinations thereof.

14. The method of claim 7, wherein the step of exfoliating the expanded graphite is carried out in a presence of a conjugated polymer.

15. The method of claim 14, wherein the conjugated polymer comprises a polythiophene.

16. The method of claim 14, further comprising coating the graphene dispersion on a substrate to form a graphene-containing composite comprising the one or more graphene nano-sheets dispersed in a matrix of the conjugated polymer.

17. The method of claim 14, wherein the one or more graphene nano-sheets are present in an, amount ranging from about 0.001% to about 5.0% by weight of a total of the one or more graphene nano-sheets and the conjugate polymer.

* * * * *

UNITED STATES PATENT AND TRADEMARK OFFICE
CERTIFICATE OF CORRECTION

PATENT NO. : 8,734,683 B2  
APPLICATION NO. : 13/306540  
DATED : May 27, 2014  
INVENTOR(S) : Wu et al.

Page 1 of 1

It is certified that error appears in the above-identified patent and that said Letters Patent is hereby corrected as shown below:

On the Title Page, Item [75] Inventors delete: "Yiliang Yu, Oakville (CA);"

and insert -- Yiliang Wu, Oakville (CA); --

Signed and Sealed this  
Twenty-ninth Day of July, 2014

Michelle K. Lee  
*Deputy Director of the United States Patent and Trademark Office*